April 14, 1970     L. L. BRIDGEWATER     3,506,055
TIRE TRUEING MACHINE

Filed March 7, 1968     2 Sheets-Sheet 1

INVENTOR.
LAWRENCE L. BRIDGEWATER
BY
ATTORNEYS

April 14, 1970     L. L. BRIDGEWATER     3,506,055
TIRE TRUEING MACHINE

Filed March 7, 1968     2 Sheets-Sheet 2

INVENTOR.
LAWRENCE L. BRIDGEWATER

BY

ATTORNEYS

United States Patent Office 3,506,055
Patented Apr. 14, 1970

3,506,055
TIRE TRUEING MACHINE
Lawrence L. Bridgewater, 1603 Albany,
Cheyenne, Wyo. 82001
Filed Mar. 7, 1968, Ser. No. 711,284
Int. Cl. B29h 21/08
U.S. Cl. 157—13                                        9 Claims

ABSTRACT OF THE DISCLOSURE

This invention relates to a tire trueing depice characterized by a double-roller drive mounted on a dolly that turns the wheel while it remains mounted on the vehicle. A specially-designed smooth-edged cup-shaped cutter mounted upon an electric drive mechanism traverses the tread on a rotating jackscrew and engages the tread tangentially along a horizontal diameter. The wheel suspension of the vehicle, which only allows vertical movement of the wheel, cooperates with the tangential cutter to prevent the latter from gouging the tread when bumps or uneven places therein pass over the wheel-drive rollers.

---

Automobile tires are not infrequently out-of-round, sometimes because of uneven wear resulting from a condition of imbalance, front end misalignment, frame damage, worn ball joints and the like. Sometimes a tire is damaged or gouged so that it needs trueing even though it remains reasonably safe to drive. Poor mounting practices can also cause a tire to run or wear out-of-round, requiring that the high spots on the tread be removed. Although rare, an occasional new tire and, of course, many recaps are eccentric relative to the axis of rotation so as to require that the tread be trued.

The prior art is replete with tire trueing machines which, for the most part, possess certain inherent deficiencies that limit their utility for the intended purpose. These deficiencies generally fall into one of three categories, the first of which is the necessity for demounting the wheel in order to perform the trueing operation. Removing one or more out-of-balance wheels from the vehicle, remounting same on the trueing machine and then, once again installing them on the vehicle is a time-consuming and, therefore, more expensive procedure.

The second deficiency is that most such units employ a shaver that leaves the tread rough so that it wears more rapidly until it becomes smooth once again. These prior art shavers usually take the form of some type of "toothed" cutter, although some employ rotary files, wire brushes, abrasive disks, wheels and drums. All of the above mechanisms roughen the tread and, in the case of the buffer-type units, they cannot rub away high spots nearly as fast or well as a cutter that actually shaves the tread.

The third deficiency is probably the most significant, namely, the tendency of the drive mechanism to respond to high spots on the tread as they pass thereover so as to cause the wheel to jump and produce variations in the tread surface as it shifts relative to the cutter or buffer head. Obviously, such a unit offers no solution whatsoever for out-of-round tires as the very conditions the machine is designed to correct are the indirect course of a further condition of imbalance being produced, possibly even worse than it was to start with.

It has now been found in accordance with the teaching of the instant invention that these and other difficulties can be overcome by, first, leaving the wheel mounted on the vehicle so that its movement as a result of "bumps" and "gouges" in the tread passing over the wheel-drive rollers is restricted to vertical motion; secondly, mounting the cutter to engage the tread surface tangentially at a point on the horizontal diameter of the wheel; and, thirdly, to use a "bell-shaped" cutter having a smooth sharpened edge that will shave off the excess rubber while leaving the tread smooth. The shaver unit, in addition, is fully adjustable to accommodate wheels and tires of different diameters. Its construction is relatively simple and straightforward so as to remain relatively free of maintenance problems. The mounting of the unit upon a dolly facilitates its movement to the different wheels and, in fact, it is built so low to the ground that the wheels can be run up onto the drive rollers if necessary although, of course, a hydraulic or air jack is ordinarily available in a facility such as would be doing this type of work and it is just as simple to jack up the wheel preparatory to lowering it onto the rollers.

It is, therefore, the principal object of the present invention to provide a novel and improved tire tread trueing machine.

A second objective is the provision of apparatus of the class above-described that enables the wheel to be left mounted upon the vehicle; yet, still shapes the tread smooth and round.

Another object of the invention herein disclosed and claimed is to provide a tire trueing apparatus that cooperates with the vehicle's wheel suspension to limit the tire movement to a strictly vertical "bounce" as imperfections in the tread pass over the wheel-drive rollers.

Still another objective is the provision of a shaver subassembly which is so located relative to the wheel-drive and suspension system that it continues to "scive" a true circular tread, even though the wheel is responding to imperfections in the existing tread by bouncing up and down.

An additional object is to provide a novel cup- or bell-shaped cutter head having a smooth knife edge that shaves or scives off the high spots in the tread without leaving a roughened surface therebeneath such as is left by the abrasive-type buffing wheels, rollers, brushes and the like.

A further object is to provide apparatus for trueing tire treads that is relatively inexpensive, easy to use, versatile, rugged, lightweight, portable, fast and even decorative in appearance.

Other objects will be in part apparent and part pointed out specifically hereinafter in connection with the description of the drawings that follows, and in which.

Figure 1:
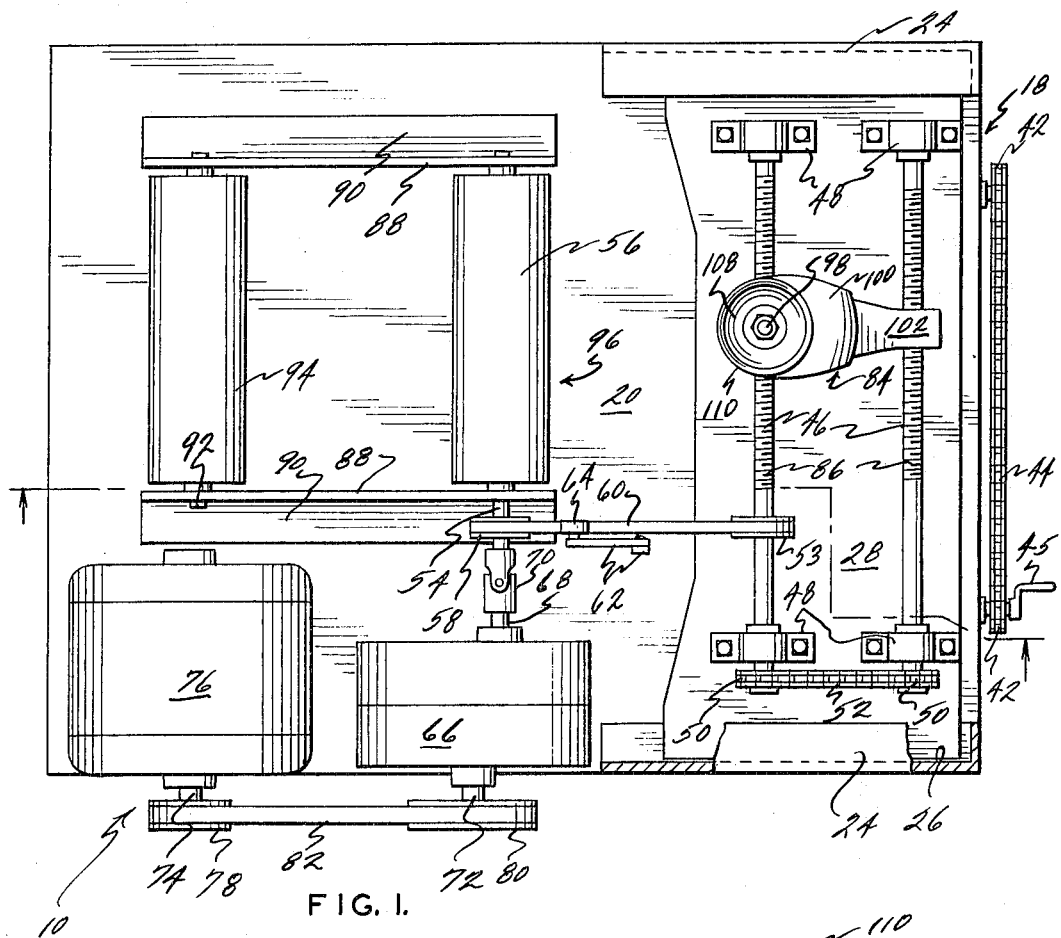
FIGURE 1 is a top plan view of the tire trueing apparatus of the present invention.
Figure 2:
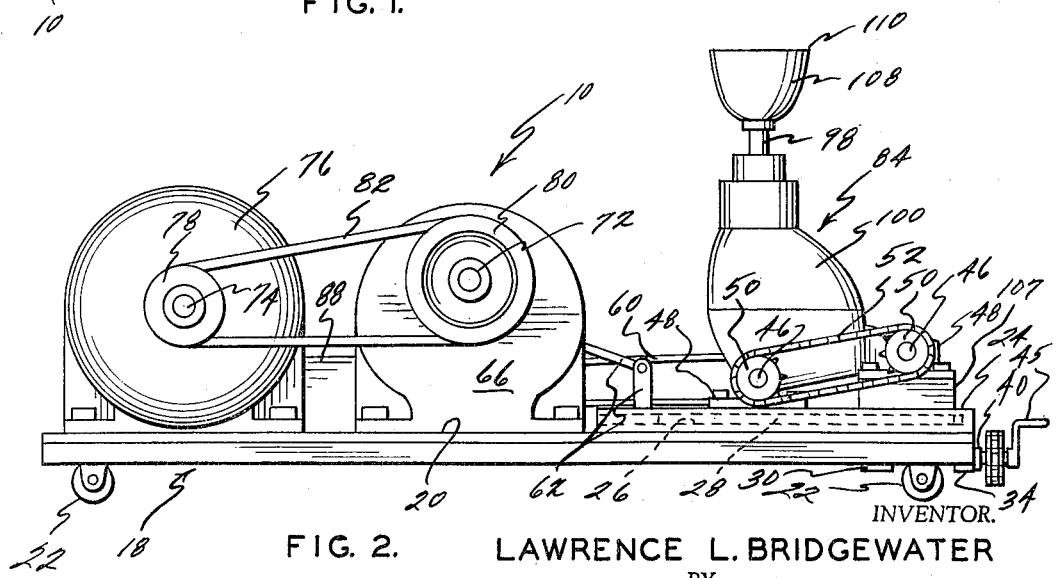
FIGURE 2 is a side elevation thereof.
Figure 3:
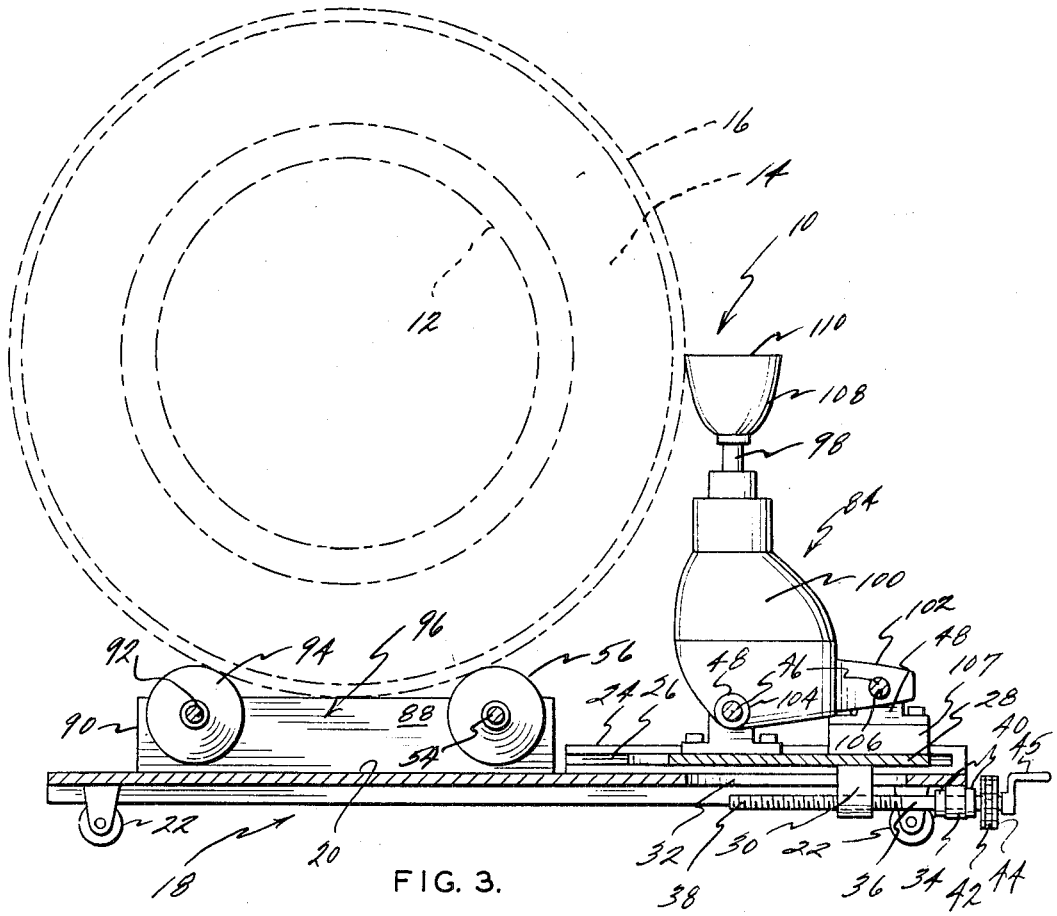
FIGURE 3 is a section taken along line 3—3 of FIGURE 1, the position of the wheel having been indicated by dotted lines; and, FIGURE 4 is an enlarged fragmentary section of the bell-shaped cutter head.

Referring now to the drawings for a detailed description of the present invention and, initially, to FIGURES 1, 2 and 3 for this purpose, reference numeral 10 represents the tire trueing machine broadly and numeral 12 has been chosen to identify in a similar way the wheel that carries the tire 14 having a tread 16 that is out-of-round and needs to be shaved. The entire apparatus is mounted atop a dolly that has been indicated in a general way by numeral 18 and which consists of a rectangular platform 20 having casters 22 mounted on its corners.

Along opposite sides of the platform adjacent one end thereof are a pair of parallel tracks 24 having slots 26 therein that open toward one another. These tracks slidably receive a plate 28 that moves back and forth therein. The underside of said plate has a pair of transversely-spaced internally-threaded bosses 30 projecting downwardly therefrom through suitably-located parallel slots 32 in platform 20 as seen in FIGURE 3. Fastened to the underside of platform 20 adjacent the edge thereof and in axial alignment with the threaded openings in bosses 30 are a pair of centrally-apertured shaft journals 34 that receive parallel jackscrews 36 for rotational movement therein. The threaded sections 38 of these jackscrews 36 screw into the internally-threaded bosses 30 and provide the means for shifting plate 28 back and forth as will now be explained.

A pair of collars 40 fasten onto the smooth section of each jackscrew on opposite sides of each journal 34 so as to prevent axial movement thereof. The ends of these jackscrews that project beyond the end of platform 20 are operatively interconnected by sprockets 42 fastened thereto and by an endless sprocket chain 44 reaved around said sproket gears. One of said jackscrews is provided with a crank-type handle 45 which, when turned, will rotate both jackscrews the same direction and at the same speed so as to run plate 28 back and forth within its tracks 24.

Mounted atop plate 28 is a second pair of longitudinally-spaced parallel jackscrews 46 that extend transversely thereof with their opposite extremities journalled for rotation shaft trunnions 48. Adjacent ends of these jackscrews are, likewise, operatively interconnected by a sprocket 50 and an endless sprocket chain 52. The forward jackscrew of the two, i.e. the one nearest the tread 16, carries a V-belt pulley 53 fastened thereto that is operatively connected to the shaft 54 of wheel-drive rollers 56 by a second pulley 58 and V-belt 60. A belt tightener 62 is fastened to the platform of the dolly and has a roller 64 bearing against belt 60 intermediate the pulleys that takes out the slack whenever the plate 28 and jackscrews journalled thereon are adjusted forwardly.

A reducer 66 is of conventional design and is mounted atop platform 20 of the dolly near the side edge thereof so that its output shaft 68 is in axial alignment with the shaft 54 of roller 56 to which it is connected in driving relation by universal coupling 70. The input shaft 72 of reducer 66 is connected to the output shaft 74 of reversible electric motor 76 by pulleys 78 and 80 along with V-belt 82. Thus, motor 76 drives reducer 66 and the latter, in turn, drives roller 56 and the jackscrews 46. Reversing motor 76, of course, reverses the direction of rotation of the entire drive train so that the cutter subassembly, that has been indicated broadly by reference numeral 84 and which will be described in detail presently, can be returned to its starting position. It is, perhaps, appropriate to point out at this stage that the tread-shaving operation is only carried out when the wheel 12 is turning clockwise as viewed in FIGURE 3. This means that roller 56 must be turning counterclockwise and that the jackscrews will be turning the same direction. The right-hand threads 86 on the jackscrews will, therefore, move the cutter subassembly upwardly in FIGURE 1 or from left to right across the tread 16.

Shaft 54 of drive roller 56 is journalled for rotation between the upturned parallel flanges 88 of a pair of angle iron sections 90 fastened atop platform 20. Shaft 92 of a driven roller 94 is similarly journalled in spaced parallel relation forwardly of shaft 54. These two rollers, one of which (56) is powered and the other (94) an idler, form the cradle subassembly indicated in a general way by numeral 96 that supports and turns the wheel 12 by frictionally engaging the tread 16 thereof as shown in FIGURE 3. The wheel being driven by roller 56, of course, provides the driving connection to roller 94.

The cutter subassembly 84 comprises a heavy-duty electric motor having an output shaft 98 emerging vertically from a case 100 much like that of a hand-held electric drill in that it has a piston grip 102 emerging from the main body. Extending transversely through the body is an internally-threaded sleeve 104 that threads onto the front jackscrew and a parallel internally-threaded opening 106 in the pistol grip portion 102 that receives the rear jackscrew in a like manner. Thus, as these jackscrews rotate in synchronous relationship to one another, the cutting tool moves therealong at a uniform rate of speed. In the particular form illustrated, the rear jackscrew is raised up on bearing blocks 107, the height of which is selected to place the axis of rotation of shaft 98 as near vertical as possible.

Figure 4:
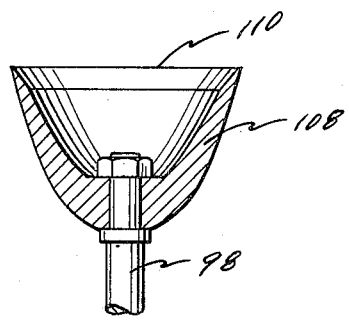

Next, with reference to all four figures of the drawing and, most particularly FIGURE 4, it will be seen that the cutting tool 108 mounted atop shaft 98 for rotation therewih has a generally cup- or bell-shaped configuraion with the upper circumferential edge 110 thereof ground or otherwise sharpened to a smooth knife edge. As seen most clearly in FIGURE 3, this cutting edge engages the tread 16 tangentially and moves transversely thereover along a line defined by a horizontal plane containing the axis of wheel rotation. The cutting tool rotates against the tread moving down onto the sharpened edge thereof and shaves off the high spots until the tread is made round. The jackscrews move the cutter from left to right at a slow, steady rate, while the latter shaves off ribbons of the tread. The tool is adjusted to fit the outside diameter of the tire by running plate 28 to and fro as needed. Once a cut has been made, the motor 76 is reversed to return the cutter head subassembly back to its original starting position, handle 45 given a turn or so to increase the depth of cut, motor 76 started up again in the opposite direction to turn wheel 12 clockwise as seen in FIGURE 3, and the motor of the cutter head is again started, if it is not already running.

Finally, with reference to FIGURE 3, it will be apparent that, as an unshaved high spot on the tread passes over roller 56, the wheel would ordinarily have a tendency to bounce up and to the left, causing the tool to miss the tread or, conversely, up and to the right when the high spot reaches the roller 94, causing said tool to dig too deep. With the wheel remaining mounted on the vehicle, however, the vehicle's suspension system will only allow the wheel to move vertically and the tangential position of the cutter on the horizontal diameter of the wheel is such that it will maintain its depth of cut quite accurately.

Having thus described the several useful and novel features of the tire trueing machine of the instant invention, it will be seen that the several worthwhile objectives for which it was developed have been achieved. Although but a single specific embodiment has been illustrated, I realize that certain changes and modifications therein may well occur to those skilled in the art within the broad teaching hereof; hence it is my intention that the scope of protection afforded hereby shall be limited only insofar as said limitations are expressly set forth in the appended claims.

What is claimed is:

1. The tire trueing apparatus which comprises: a dolly having casters at the corners thereof forming a movable horizontal platform adapted to be rolled into position beneath a mounted rubber-tired vehicle wheel, a pair of inwardly-opening longitudinally-slotted tracks mounted in transversely-spaced parallel relation atop the dolly adjacent the rear end thereof, a horizontal plate mounted within the slots in said tracks for longitudinal slidable movement, a pair of transversely-extending jackscrews journalled for rotation atop the plate in longitudinally-spaced parallel relation, power transfer means operatively interconnecting said jackscrews adapted to turn both in the same direction and at the same speed when either is turned, a pair of rollers journalled for rotation atop the dolly in longitudinally-spaced parallel relation to one another and to the jackscrews forwardly of the latter, drive means including a motor and speed reducer drivingly connected to one of said rollers and one of said jackscrews, a cutter subassembly mounted between said jackscrews for transverse movement therealong upon rotation of the latter, said cutter subassembly including a motor having a vertically-disposed output shaft and a cup-shaped cutting tool mounted atop said shaft for rotation therewith, the upper circumferential edge of said cutting tool being sharpened to a smooth knife edge and located to engage the tread of a tire tangentially at a point closely adjacent along a horizontal line contained within a horizontal plane passing through the axis of rotation of a vehicle wheel cradled between the rollers, and plate adjustment means operatively connected to the plate operative upon actuation to shift the latter along with the cutter subassembly carried thereby longitudinally to place the cutting tool in position to shave the tread of the tire turning downwardly thereagainst.

2. The tire trueing apparatus as set forth in claim 1 in which: the speed reducer has an output shaft axially aligned and operatively connected to one of the roller shafts, and in which a second power transfer means operatively interconnects the driven roller shaft and one of the jackscrews.

3. The tire trueing apparatus as set forth in claim 1 in which: the vehicle wheel cradled between the rollers forms the driving connection therebetween.

4. The tire trueing apparatus as set forth in claim 1 in which: the plate adjustment means comprises at least one additional jackscrew journalled at the rear end of the dolly for rotation about a horizontal axis extending longitudinally thereof, an internally-threaded member attached to the plate in position to receive the threaded portion of said additional jackscrew, and crank means attached to said jackscrew for rotating same so as to slide said plate forwardly and rearwardly.

5. The tire trueing apparatus as set forth in claim 1 in which: the motor of the drive means is reversible.

6. The tire trueing apparatus as set forth in claim 1 in which: the cutting tool is beveled on the inside of the rim to produce the sharpened knife edge.

7. The tire trueing apparatus as set forth in claim 2 in which: the second power transfer means comprises a belt and pulley drive, and in which belt tightening means is mounted on the dolly in contact with the belt of said belt and pulley drive operative to take up the slack therein when the plate is shifted forwardly toward the rollers.

8. The tire trueing apparatus as set forth in claim 4 in which: the plate adjustment means includes two jackscrews mounted in longitudinally-extending transversely-spaced parallel relation to one another, two internally-threaded members fastened to the plate and located to receive said jackscrews, and power transfer means interconnecting said jackscrews operative to turn both in the same direction and at the same speed when said additional jackscrew carrying the crank is turned.

9. The tire trueing apparatus as set forth in claim 8 in which: the dolly includes longitudinally-extending transversely-spaced parallel slots corresponding to each jackscrew, the internally-threaded members are fastened to the underside of the plate projecting down through said slots, and the jackscrews are journalled on the underside of the dolly.

References Cited

UNITED STATES PATENTS

| | | | |
|---|---|---|---|
| 2,749,979 | 6/1956 | Prewett | 157—13 |
| 2,897,882 | 8/1959 | Barrett | 157—13 |
| 2,925,125 | 2/1960 | Curry | 157—13 |
| 3,426,828 | 2/1969 | Neilsen | 157—13 |

GRANVILLE Y. CUSTER, JR., Primary Examiner